Oct. 7, 1924.

J. McARTHUR

VEHICLE BODY

Filed Feb. 14, 1922

Inventor
John McArthur,
By
Attorney

Oct. 7, 1924.
J. McARTHUR
1,511,172
VEHICLE BODY
Filed Feb. 14, 1922   2 Sheets-Sheet 2
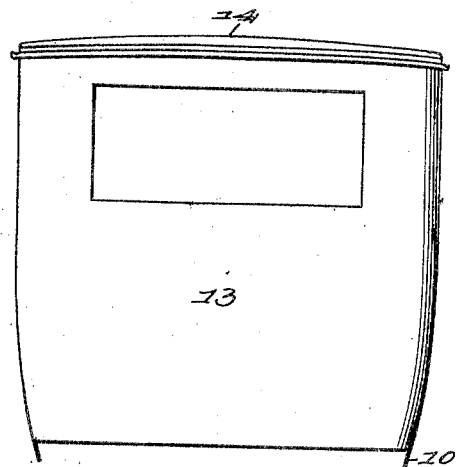
Fig.3.
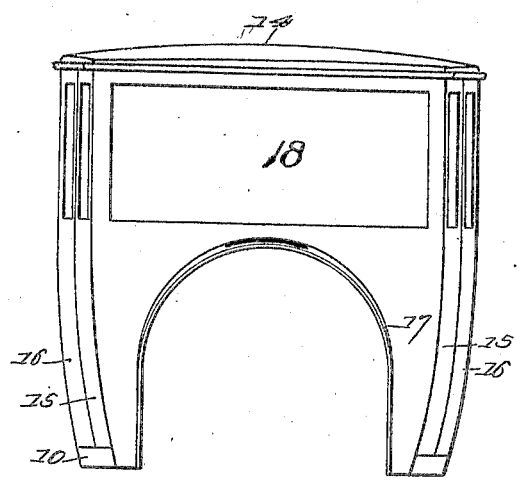
Fig.4.
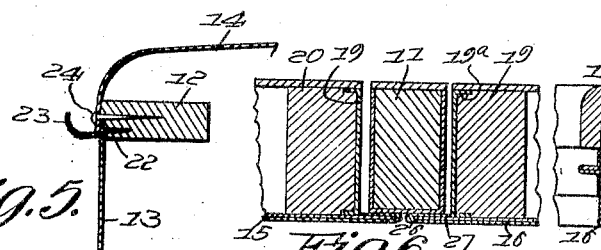
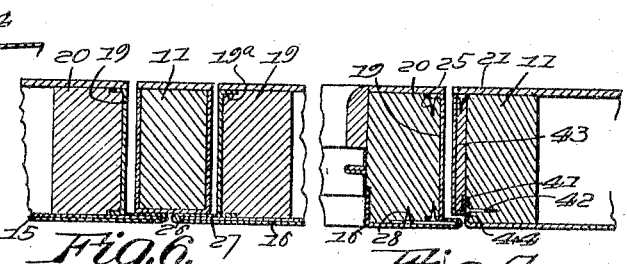
Inventor
John McArthur,
By
Attorney Patented Oct. 7, 1924.

1,511,172

UNITED STATES PATENT OFFICE.

JOHN McARTHUR, OF DETROIT, MICHIGAN.

VEHICLE BODY.

Application filed February 14, 1922. Serial No. 536,479.

*To all whom it may concern:*

Be it known that JOHN McARTHUR, a citizen of the United States of America, residing at Detroit, in the county of Wayne and State of Michigan, has invented new and useful Improvements in Vehicle Bodies, of which the following is a specification.

The object of the invention is to provide a closed body for motor driven vehicles particularly of the limousine, coupé, cab and sedan type which will not involve a load upon the chassis in excess of that of an ordinary open or touring body for the same car and which therefore may be substituted for the latter without necessitating any change in the construction of the chassis or in the tension or resistance of the springs used in supporting the body, to the end that the same car may be provided with interchangeable bodies with the assurance that the riding qualities of the vehicle will be the same regardless of the type of body used.

It is a further object of the invention to provide a closed body for vehicles of the type indicated which while having a wall covering or filler supported and stiffened by a skeleton frame of conventional or preferred construction which shall be capable of being painted and varnished or otherwise treated to receive a high polish of any desired color, as in the present practice, shall have a degree of flexibility at the joints which will permit of yielding to a limited extent to compensate for twisting or racking of the chassis incident to the progress of a vehicle over ordinary road surfaces, without such bending or buckling of the wall covering or filler as to mar, crack or injure the finish of the surface, and wherein moreover the means by which the wall covering or filler is secured to the skeleton frame are concealed from the view of an observer, so that the exposed surface of the car body presents a smooth and attractive appearance.

With these general objects in view the invention consists in a construction and combination of parts of which a preferred embodiment is shown in the accompanying drawings, wherein:—

Figures 3 and 4 are respectively rear and front views thereof.

Figure 1:
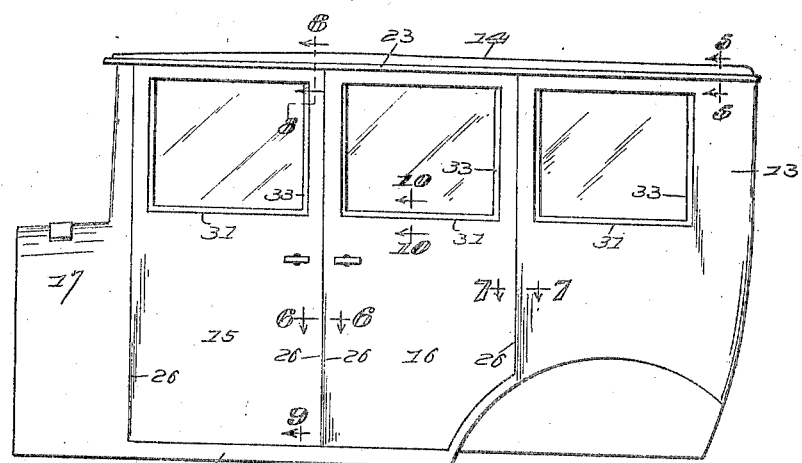
Figure 1 is a side view of a closed car body constructed in accordance with the invention.
Figure 2:
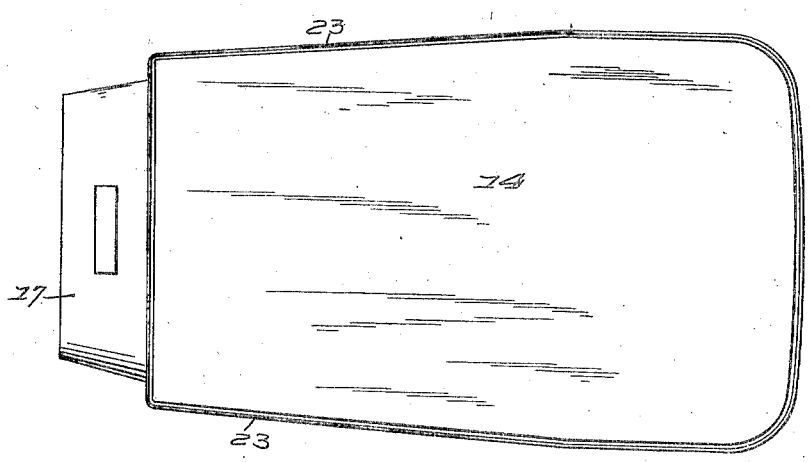
Figure 2 is a plan view of the same.

Figures 5, 6, 7, 8, 9 and 10 are respectively detail sectional views on the planes indicated by the line 5—5, 6—6, 7—7, 8—8, 9—9, and 10—10 of Figure 1.

Figure 11 is a section showing an edge view, and

Figure 12 is a side view of one of the stationary frame uprights showing the means for anchoring the extremities thereof respectively to the top bar and the sill of the body.

The body consists essentially of a skeleton frame having sill bars 10, stationary uprights 11 and a top frame 12, to which is attached a wall covering or filler 13 and a top covering 14, suitable doors 15 and 16 being mounted in the usual way between prescribed uprights or standards of the skeleton frame, and a hood extension 17 being arranged in connection with the front wall beneath the usual or conventional wind shield 18.

The elements of the skeleton frame may be of wood of an inferior grade, provided it is free from blemishes detracting from the strength thereof, by reason of the fact that it is preferred to conceal the outer surfaces thereof either by the wall and roof coverings or fillers or by supplemental facings of a material corresponding with that of the wall and roof or top coverings, to the end that these surfaces may be finished in conformity with those of the wall and roof,—such facings, for example, being shown at 19 in Figures 6 and 7 and being applied to the uprights or standards 20 of the door as well as to those of the skeleton frame. The inner surface of the body is formed by a lining or upholstery indicated at 21 and which obviously may be of any preferred design to suit the taste of the builder or designer or the character or intended purpose of the vehicle.

The upper edges of the wall covering or filler are secured to the outer edges of the bars forming the top frame 12 by fastening means 22 consisting in the construction illustrated of tacks or nails, and the edges of the top or roof covering 14 are disposed in overlapping relation with the edges of the wall covering and in concealing or obscuring relation with the fastening devices 22 thereof, so as to cut off a view of said fastening devices from the exterior of the vehicle, said edges of the top or roof covering preferably being rolled upwardly as indicated at 23 to form eaves-trough or gutters particularly at the sides and front of the top so as to prevent dripping of rain from the roof or top over the wind shield and door openings and cause the discharge of water flowing from the top at the rear thereof. The edges of the top or roof covering are secured by nails or tacks 24 driven into the top frame 12 within the roll 23 and therefore invisible to an observer standing on the level of the car and outside of the same. The edges of the top or roof covering thus form facing strips for housing and concealing the facing means for the wall covering, and the fastening means for the edges of the top or roof covering are in turn concealed by the returned gutter forming flanges of the latter.

The fastening means consisting of tacks or nails 25 for the facing strips 19 are concealed by the overlapping edges of the wall covering and upholstery, the edges of said facing strips being flanged as indicated at 19ª to lie parallel and in contact with the inner and outer surfaces of the frame bars forming the uprights or standards. The wall covering of the doors are crimped at their edges as shown at 26 around anchoring strips 27 which are secured to the uprights or standards in overhanging relation with the facing surfaces of said bars, so that the means of attachment consisting of tacks or nails 28 of the anchoring strips are concealed by the overlying portions of the wall covering. The crimps formed in the edges of the wall covering are sufficient to hold the latter in proper relation with the anchoring strips and this means of attachment serves to present an unbroken exterior surface of the wall covering so as to receive an unbroken uniform finish or polish with no tendency to crack or star as would a hard finish adjacent to an exposed fastening means. Moreover the joint formed by the crimp is capable of a sufficient yielding quality to compensate for the unavoidable twist of the body incident to the racking of the chassis in traversing uneven road surfaces.

In Figures 11 and 12 there is shown a means of anchoring the extremities of the uprights or standards to the sill and top frame consisting of the flanging of the facing strip 19 at its lower end to form ears 28 secured to the sill by tacks or nails 29, and an angle plate 30 secured by similar fastening means to the inner surfaces of the upper end of the upright and the frame 12 to be covered in the finished car body by the interior upholstery or lining.

The upper edge of the wall covering of the door as shown in Figure 10 is crimped as indicated at 31 around a sill plate 32 outside of the plane of the sash 33, to form a joint similar in construction and operation to that described in connection with the uprights or standards of the door structures and as represented by the crimps 26 in reference to the anchor plates 27.

Furthermore it is preferred to provide the door openings with tapered lintel threshold strips 34 and 35 substantially secured to the top frame and sills by screws 36 or the equivalents thereof, and to provide the upper and lower edges of the doors with complemental transversely wedge-shaped stop strips 37 and 38 adapted for mating engagement with the lintel and threshold strips as a means of excluding wind and rain, and the door locking bolts 39 which in the construction illustrated are shown both at the top and the bottom of the door (see Figures 8 and 9), may be arranged to engage the inner and thicker edges of said lintel and threshold strips as a means of holding the door in its closed position, to the end that said strips thus perform a dual function. By slightly beveling the outer faces of the bolt noses as shown at 40, the engagement thereof with the inner edges of the lintel and threshold strips may serve as a means of taking up lost motion to prevent rattling and snugly seating the surfaces of the door carried strips upon the beveled surfaces of the lintel and threshold strips.

It will be noted that the stop, lintel and threshold strips 37, 38 and 34 and 35 are secured detachably in position, making it possible to remove them, when worn, to permit new ones to be installed. In this way, the edge portions of the door opening, especially the threshold thereof, may be renewed.

The wall and top or roof coverings preferably consist of sheet metal of comparatively thin gage and in practice it is preferred to use a metal such as aluminum for the reason that while being relatively strong and tough and at the same time light in weight, and furthermore having a comparatively low co-efficient of expansion and contraction under variations of temperature, it lends itself readily to the application of conventional forms of finishing preparations in the way of paint and varnish and is adapted in yielding to strains such as those incident to the movement of the car to maintain a smooth contour and avoid buckling or crimping and hence avoid the cracking or marring of a highly polished surface having a hard finish. An important factor in maintaining a smooth surface of the wall covering resides in the fact that the edges thereof are not attached or anchored directly to the exterior surfaces of the bars forming the skeleton frame, but where attached to the said bars are flanged as shown at 41 in Figure 7 and to lie in contact with the facing surfaces of the frame bars such as the uprights or standards, with the fastening means such as nails or tacks 42 covered by facing strips which may as indicated at 43 be padded by filler strips of wood or any equivalent material so as to produce a necessary door rabbet 44. The fastening means for the wall covering therefore are not only concealed, where used in direct relation with the covering, but are engaged with flanged portions of the covering so as to afford a degree of flexibility at the line of bearing of the covering upon the frame, so that the tendency under strain is to maintain the integrity of the hard finished coating or surfacing material with which the covering is provided. Also it will be noted that the wall covering at the top and bottom of the doors is provided with crimped flange portions 37' and 38' which overlie the stop strips of the upper and lower edges respectively of the doors.

Having described the invention, what is claimed as new and useful is:—

1. In a closed vehicle body comprising a skeleton frame including upright and horizontal frame members, certain of which being arranged and causing to be formed adjacent door frames constituting a part of the vehicle body, doors operatively mounted in said door frames, and stop and threshold strips carried by the upper and lower adjacent edges of the doors and the door frames, said stop and threshold strips being detachable whereby they may be renewed and having their adjacent engaging faces beveled, allowing the doors to swing outwardly, the beveled faces of the threshold strips of the door frames constituting means on which latch bolts may ride, whereby the latch bolts may engage behind the major inner edges of the threshold strips of the door frames, said major inner edges of the threshold strips constituting catches.

2. In a closed vehicle body comprising a skeleton frame including upright and horizontal frame members, certain of which being arranged and causing to be formed adjacent door frames constituting a part of the vehicle body, doors operatively mounted in said door frames, stop and threshold strips carried by the upper and lower adjacent edges of the doors and the door frames, said stop and threshold strips being detachable whereby they may be renewed and having their adjacent engaging faces beveled, allowing the doors to swing outwardly, the beveled faces of the threshold strips of the door frames constituting means on which latch bolts may ride, whereby the latch bolts may engage behind the major inner edges of the threshold strips of the door frames, said major inner edges of the threshold strips constituting catches, and a wall covering of sheet metal for the skeleton body frame and for the doors, the latter wall covering having crimped flange portions at the top and bottom of the doors overlying the stop strips of the upper and lower edges of the doors.

3. A closed vehicle body having a door opening including a door therefor and wherein the opening is provided with upper and lower outwardly deflected lintel and threshold strips and the door being provided with complemental upper and lower wedge-shaped stop strips for mating relation with the lintel and threshold strips, the lintel and threshold and wedge-shaped stop strips being removable whereby they may be renewed, the outwardly deflected surfaces of the lintel and threshold strips constituting means on which latch bolts may ride, whereby the bolts may engage behind the major inner edges of the lintel and threshold strips, said major inner edges constituting catches.

In testimony whereof he affixes his signature.

JOHN McARTHUR.